United States Patent [19]
Menelly

[11] Patent Number: 5,810,602
[45] Date of Patent: Sep. 22, 1998

[54] GRAVITY TEACHING AID

[76] Inventor: Daniel James Menelly, 109 Main St., Chesire, Conn. 06410

[21] Appl. No.: 803,336

[22] Filed: Feb. 20, 1997

[51] Int. Cl.$^6$ .................................................. G09B 23/10
[52] U.S. Cl. .................................................. 434/302; 473/570
[58] Field of Search ........................... 434/300, 301, 434/302; 473/570, 464, 451, 458; 446/437; 150/150

[56] References Cited

U.S. PATENT DOCUMENTS

| | | | |
|---|---|---|---|
| 2,219,074 | 10/1940 | Guillou | 473/570 |
| 2,277,057 | 3/1942 | Bach | 473/570 |
| 2,524,546 | 10/1950 | Sinclaire | 473/570 |
| 2,667,906 | 2/1954 | Stiller | 150/150 |
| 2,731,266 | 1/1956 | Neilson | 473/570 |
| 2,868,254 | 1/1959 | Saad | 150/150 |
| 3,011,048 | 11/1961 | O'Brien | 473/570 |
| 3,026,110 | 3/1962 | Hess et al. | 473/510 |
| 3,063,487 | 11/1962 | Mullin | 150/150 |
| 3,102,362 | 9/1963 | Neal | 473/570 |
| 3,320,686 | 5/1967 | Blackburn | 434/302 |
| 3,629,957 | 12/1971 | Somashekar | 434/302 |
| 4,194,737 | 3/1980 | Farmer | 473/570 |
| 4,212,460 | 7/1980 | Kraft | 473/577 |
| 5,551,688 | 9/1996 | Miller | 473/570 |

FOREIGN PATENT DOCUMENTS

| | | | |
|---|---|---|---|
| 556049 | 9/1957 | Belgium | 434/302 |
| 896675 | 1/1982 | U.S.S.R. | 434/301 |

*Primary Examiner*—Paul J. Hirsch
*Attorney, Agent, or Firm*—Richard A. Menelly, Esq.

[57] ABSTRACT

A gravity teaching aid in the form of a tennis ball which includes a magnet for retaining the tennis ball against a metal surface against the downward pull exerted by the earth's magnetic field.

1 Claim, 1 Drawing Sheet

GRAVITY TEACHING AID

BACKGROUND OF THE INVENTION

Devices are currently employed to teach students about the effects of gravity on falling objects. One example of a gravity teaching aid is found in U.S. Pat. No. 4,474,437 entitled "Teaching Aid for Simulating Gravitational Bending of Light". Such complex examples are not readily understood by students at the Grammar and Middle School levels.

It would be advantageous to the students to have a more simple arrangement for teaching the Law of Gravity without having to involve complex optical terminology.

Accordingly, one purpose of the invention is to provide a simple teaching aid which demonstrates "anti-gravity" effects in order to explain the Law of Gravity.

SUMMARY OF THE INVENTION

The invention comprises a tennis ball or the like which includes a magnet for retaining the tennis ball against a metal surface against the downward pull exerted by the earth's magnetic field.

DESCRIPTION OF THE PREFERRED EMBODIMENT

Figure 1:
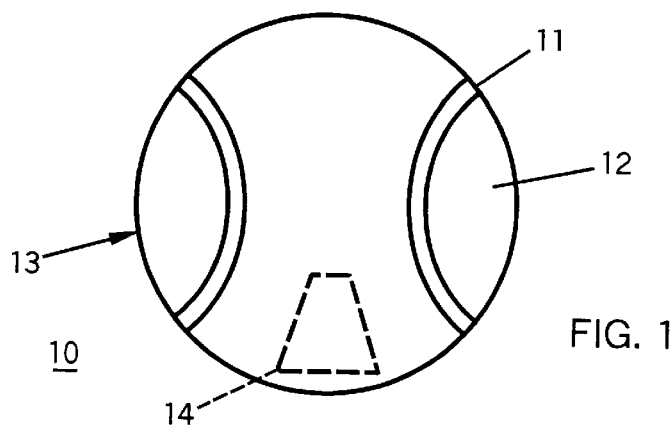
FIG. 1 is a front plan view of the tennis ball containing a magnet in accordance with the teachings of the invention.

In accordance with the invention, a gravity teaching aid 10 in the form of a tennis ball 13 containing a magnet 14 is depicted in FIG. 1. The tennis ball is of the type consisting of a spherical rubber base 11 to which a felt cover 12 is attached.

Figure 2:
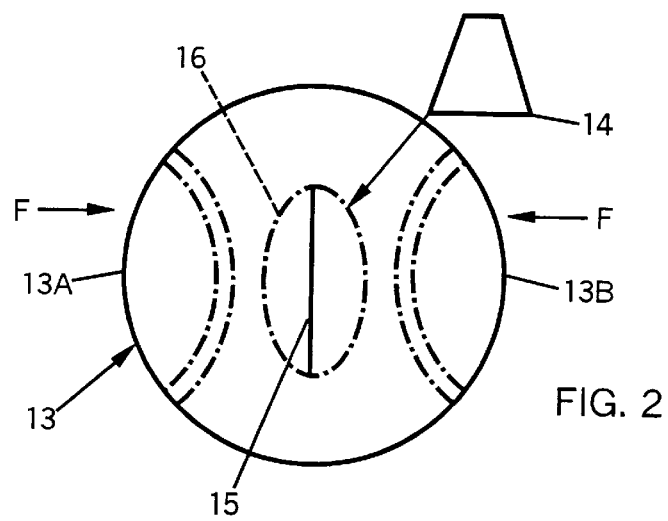
FIG. 2 is a front plan view of the tennis ball of FIG. 1 depicting the magnet in isometric projection.

As shown in FIG. 2, the tennis ball 13 is provided with a small slit 15 which is enlarged to form the opening 16 depicted in phantom as the sides 13A, 13B are subjected to compressive forces as indicated by arrows. The rare earth metal trapezoidal magnet 14, such as neodymiumpraesiodium, is then inserted within the opening 16 and the forces are removed to allow the tennis ball 13 to assume the spherical shape shown earlier in FIG. 1.

Figures 3A, 3B:
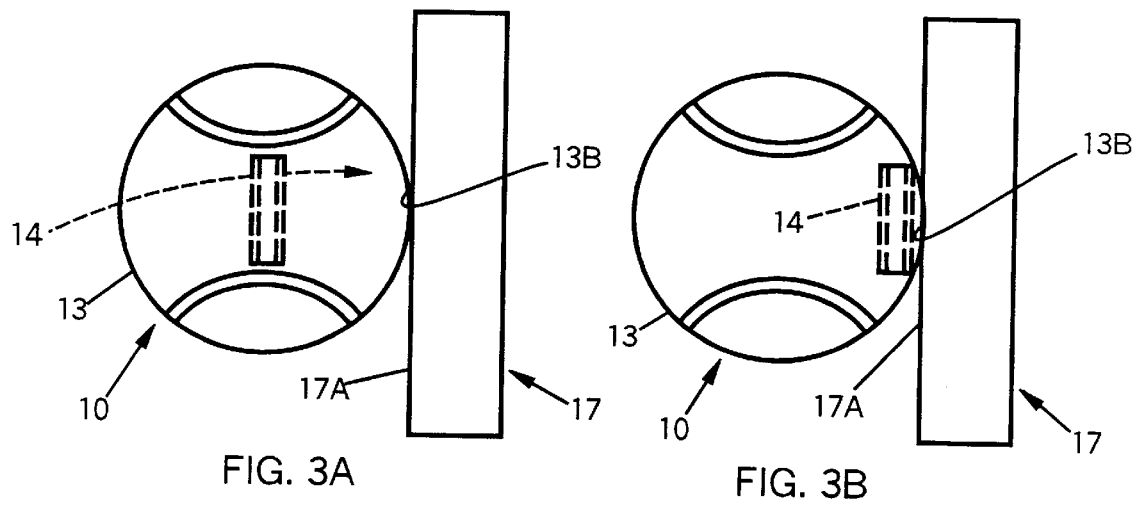
FIG. 3A is a side view of the tennis ball of FIG. 1 immediately upon impact.
FIG. 3B is a side view of the tennis ball of FIG. 1 immediately after impact.

With the magnet 14 contained within the tennis ball to form the gravity teaching aid 10 depicted in FIGS. 3A, 3B the influence of gravity is demonstrated by first taking a tennis ball (not shown) that does not include the magnet 14 and tossing against an elevated metal plate as illustrated at 17. The tennis ball then drops to the ground under the influence of magnetic attraction by the earth's magnetic field. When the gravity teaching aid 10, consisting of the tennis ball 13 containing the magnet 14 is tossed against the same plate 17, it strikes the surface 17A of the metal plate 17 and partially compresses upon contact, as indicated at 13B due to the rubber properties of the tennis ball surface. The magnet 14 then accelerates in the indicated direction against the surface 17A and strikes against the surface 17A, as indicated in FIG. 3B. At the same, the surface 13B returns under the expansion of the tennis ball 13 to the spherical configuration depicted in FIG. 3B. The magnet 14 is held against the surface 17A of the metal plate 17 due to the force of attraction between the magnet and the metal plate, to cause the teaching aid 10 to tenaciously remain in contact with the metal plate 17 to therefore defy the downward attraction force due to the earth's magnetic field, or "gravity".

A simple teaching aid to demonstrate the force of attraction of gravity has herein been described in the form of a tennis ball containing a magnet powerful enough to overcome the earth's gravitational attraction for the tennis ball's mass.

I claim:

1. A method of forming a gravity teaching aid comprising the steps of:

providing a tennis ball having a spherical shape;

forming a slit opening in said tennis ball;

applying a compression force to said tennis ball to enlarge said slit opening; and inserting a rare earth magnet within said opening.

* * * * *